United States Patent Office 3,319,087
Patented May 9, 1967

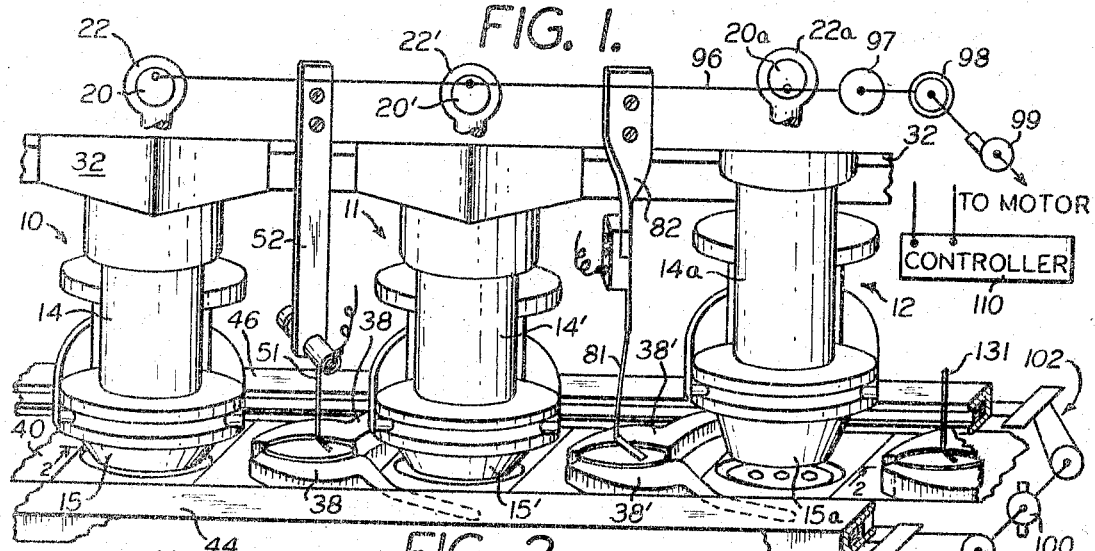
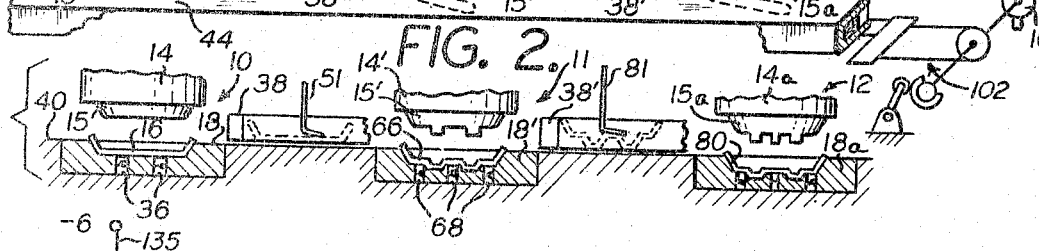
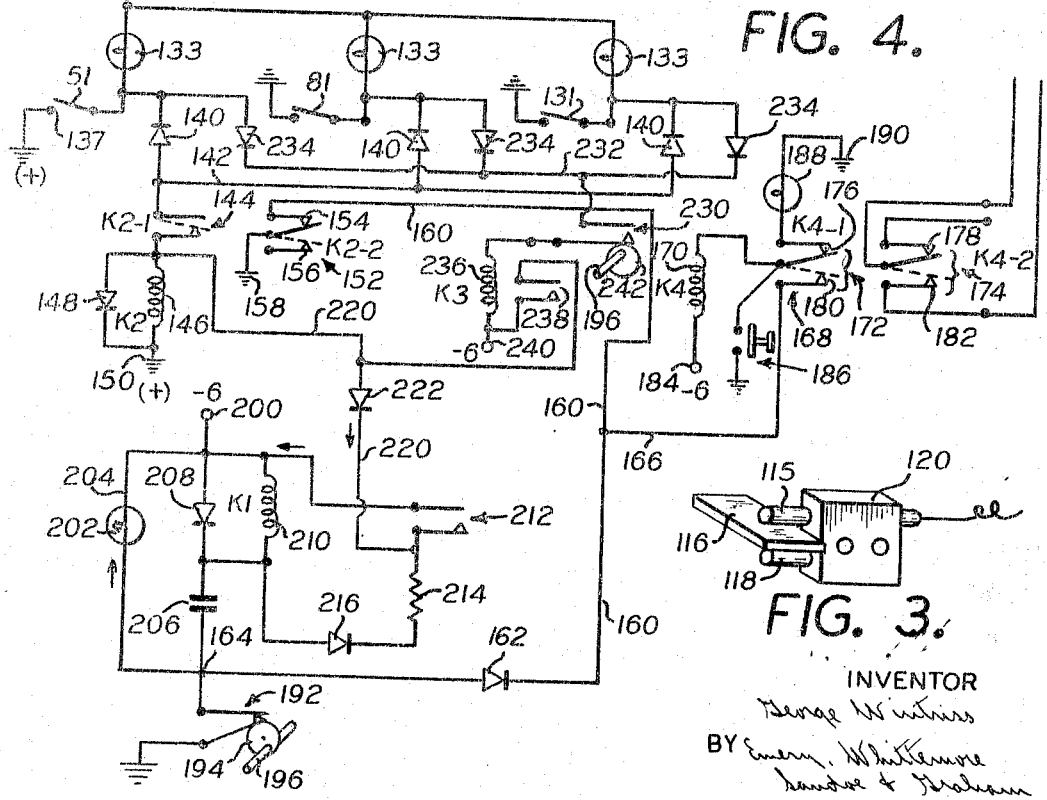

3,319,087
CONTROL SYSTEM FOR AUTOMATIC MACHINE
George Wintriss, Carversville, Pa., assignor to Industrionics Controls, Inc., New York, N.Y., a corporation of New York
Filed Apr. 22, 1964, Ser. No. 361,817
10 Claims. (Cl. 307—112)

This invention relates to improved control equipment for automatic machines.

In order to prevent possible damage to a machine in the event of malfunction, it is customary to provide controls that have detectors at various locations for providing signals to a control mechanism in the event of any departures from normal operation. For example: failure of the machine to deliver a work piece, at the time in the cycle when a work piece would normally be delivered, may result from the work piece sticking in a die, and operation of controls to stop the machine before the die closes on a new piece of stock may prevent damage or destruction of the die.

Similarly, failure of a multi-station machine to transfer work pieces from each station to the next station is a malfunction which it is important to detect promptly. Other examples of malfunctioning are buckling of a stock strip, and exhaustion of the supply of stock to the machine.

It is an object of this invention to provide a machine with improved control means for detecting malfunctioning and for stopping the machine promptly in the event of malfunctioning. Apparatus for this purpose which utilizes electronic equipment has proved unreliable on occasion, and, therefore, it is another object of this invention to provide control apparatus that is more reliable than that which has been available in the prior art.

The greater reliability of this invention is obtained principally by using more rugged equipment, by having simplified electric circuitry, and by constructing the equipment so that injuries to parts and build-up of metal shavings can not prevent the control equipment from properly protecting the machine.

Other objects, features and advantages of the invention will appear or be pointed out as the description proceeds.

In the drawing, forming a part hereof, in which like reference characters indicate corresponding parts in all the views:

FIGURE 1 is a diagrammatic, perspective view of a machine having several work stations and apparatus for transferring work pieces from one station to the next with detection means made in accordance with this invention;

FIGURE 2 is a diagrammatic, sectional view taken on the line 2—2 of FIGURE 1;

FIGURE 3 is a perspective view of a modified form of detection equipment from that shown in FIGURE 1; and FIGURE 4 is a wiring diagram for the apparatus shown in FIGURES 1 and 2.

This invention will be described in connection with a multi-work-station machine, but it will be understood that some features of the invention can be used on a machine having a single work station.

The automatic machine shown in FIGURES 1 and 2 has a plurality of work stations 10, 11 and 12. At the work station 10 there is a ram 14 which brings a tool 15 down into position to force a blank 16 into a die 18. The ram 14 is reciprocated toward and from the die 18 by an eccentric 20 operating a motion-transmitting connection 22 which raises and lowers the ram 14. Such operating mechanism is well known in the art and no further description of it is necessary for a complete understanding of this invention.

The blank or work piece 16 is ejected from the die 18, as the tool 15 moves away from the die, by ejection pins 36, in accordance with conventional practice. The work piece 16 is then transferred to the work station 11 by a conveyor having arms 38 which grip the work piece 16 and which advance the work piece along a table or support 40.

These arms 38 extend from housings 44 and 46 on opposite sides of the table 40 and there are linkages in the housings for moving the arms 38 into and out of contact with the work pieces and for advancing the arms 38 from one work station to the next, and then back again, after releasing a work piece, to transfer the next piece from one work station to the next.

Between the work stations 10 and 11 there is a feeler 51 carried by a support 52 connected to a portion of the fixed frame 32 of the machine. The feeler 51 is in position to touch a work piece as the work piece travels from the work station 10 to the work station 11 and this contact of the feeler with the work piece closes an electric circuit.

With metal work pieces gripped by metal arms 38, the feeler 51 can be a conductor in the electric circuit and can operate to ground the circuit on the frame of the machine through the work piece and the conveyor arms 38. If the work piece is not a conductor of electricity, then the feeler can be of a type which closes a circuit within the upper portion of the feeler structure. Such a feeler is shown in the patent application of Lydia Torres, Ser. No. 157,371, filed Dec. 6, 1961, now Patent No. 3,213,225.

At the work station 11 there is a ram 14' which moves a tool 15' toward and from a die 18'. The ram 14' is operated by an eccentric 20' through a motion-transmitting connection 22'.

A work piece transferred from the work station 10 to the work station 11 is deposited by the conveyor arms 38 in the die 18'. The work piece in this die 18' is indicated in FIGURE 2 by the reference character 66. After being operated upon in the die 18', the work piece 66 is ejected by pins 68 and is moved by conveyor arms 38 from the work station 11 to the work station 12.

At this third work station 12 there is a ram 14a which moves a tool 15a toward and from a die 18a. The ram 14a is operated by an eccentric 20a through motion-transmitting connections 22a.

The apparatus illustrated may have other work stations and in any event will have means for delivering a work piece 80 from the die 18a whether the work piece is to go to another work station or to a delivery chute or conveyor at the discharge end of the machine.

Between the work stations 11 and 12 there is a feeler 81 connected by a bracket 82 to the fixed portion of the frame 32. This feeler 81 is similar to the feeler 51 and is located with its lower end in the path of a work piece moving from the work station 11 to the work station 12.

The operating mechanism for the machine is shown diagramatically in FIGURE 1. The eccentrics 20, 20' and 20a are operated by a drive shaft 96 rotated by a clutch 97, the driving side of which is connected with a flywheel 98.

The flywheel 98 is driven, through a transmission 99, from a motor 100. This motor also drives mechanism 102 which controls the operation of the transfer or conveyor arms 38 and 38', and similar conveyor arms which remove the work piece from the third station 12. Thus the moving parts of the machine are operated in timed relation to one another by power supplied from a single motor 100. The particular operating mechanism for the rams and conveyor forms no part of the present invention and no detailed illustration of it is necessary since such automatic machines are well known in the art.

Control means are provided for stopping further operation of the machine in the event that the machine fails to function normally at any work station. If a work piece is not ejected from one of the dies, that die may be damaged or destroyed by continued operation of the machine if a new work piece is moved into the die and is superimposed on the piece which has not been ejected. The apparatus for stopping further operation of the machine may stop the motor by shutting off the power and by applying a brake; but quicker response can be obtained by disengaging clutches since this makes it unnecessary to overcome the inertia of the motor and flywheel, and a brake can be effective more quickly.

The disengagement of clutches need not throw the different parts of the machine out of timed relation with one another because jaw clutches can be used which engage in only one position, or the elements which move in timed relation can be operably connected with one another beyond the clutch.

In order to simplify the illustration and explanation of this invention, a controller 110 is shown for stopping operation of the machine by means of a solenoid clutch which is representative of means for stopping the supply of power to the moving parts of the machine which engage the work pieces.

FIGURE 3 shows a modified construction for the detection apparatus. In place of the feelers 51 and 81 shown in FIGURES 1 and 2, there is a contact 115 located just above the normal path of travel of a strip of stock 116 which is fed to a machine across a support 118. This detection apparatus, shown in FIGURE 3, can be used to detect the termination of the stock feed either as a result of a break in the strip or exhaustion of the supply of strip. Either situation breaks the contact between the strip 116 and the supporting contact 118.

The detection equipment shown in FIGURE 3 will also detect buckling or warping of the strip 116. Any buckling or warping which is significant will cause the strip 116 to touch the contact 115 and thus provide a signal through a controller 120 having supports of which the contacts 115 and 118 are a part.

FIGURE 4 shows a wiring diagram for the apparatus shown in FIGURES 1 and 2. This diagram shows the feelers 51 and 81 and also shows a similar feeler 131 which is located beyond the third work station for detecting delivery of work pieces from the third work station. There is a separate signal lamp 133 connected with each of the feelers 51, 81 and 131. The other side of each of these lamps 133 is connected with a conductor 135 having a voltage potential which, in the preferred construction, is lower than the ground potential of the machine. The wiring diagram shows each feeler 51, 81 and 131 in position to touch a contact 137 which is at the ground potential of the machine. This contact 137 is the work piece if the machine is operated with metal work pieces, or it is a ground connection of the feeler if the feeler is one for use with work pieces that are not electrical conductors.

The side of each lamp 133, which connects with one of the feelers, is also connected with a diode 140 and each of these diodes is connected with a common conductor 142 leading to a switch 144 (K2–1). This switch 144 has a bias toward open position but it is closed by a relay coil 146 (K2) whenever the coil 146 is energized. A diode 148 is connected across the coil 146 when the side of the coil opposite the switch 144 is grounded at 150.

There is another switch 152 (K2–2) which has a bias toward an upper contact 154 but which is closed against a lower contact 156 by the coil 146 when that coil is energized. The movable contact of the switch 152 is grounded at 158 and the upper contact 154 is connected with a conductor 160.

The conductor 160 is connected through a diode 162 to a terminal 164. It is also connected with another conductor 166 leading to a reset relay 168 having a coil 170 (K4) and switches 172 (K4–1) and 174 (K4–2). Both of these switches 172 and 174 have a bias toward upper contacts 176 and 178, respectively, but when the coil 170 is energized, the switches 172 and 174 close against lower contacts 180 and 182, respectively.

When the switch 172 is closed against the lower contact 180, the coil 170 is connected through the conductors 166 and 160 to the upper contact 154 of the switch 152. If the coil 146 is not energized, and the switch 152 is closed against its upper contact 154, the coil 170 is grounded at 158 through the switch 152. The lower end of the coil 170 is connected with a terminal 184 having a voltage potential less than ground potential, as indicated by the voltage FIGURE —6, this voltage being given merely by way of illustration.

In order to start the control apparatus, the reset relay 168 is operated manually by a push-button switch 186 which provides a ground for the coil 170 when the switch 172 is closed against its upper contact 176.

Although the upper contact 176 is connected with a signal light 188, which is grounded on the other side at 190, the resistance of the signal light 188, when lighted, is too high to permit enough current to flow through the coil 170 to operate the switches 172 and 174.

When the switch 174 is closed against its lower contact 182, the control mechanism 110, of which the switch 174 is a part, permits the machine to run continuously. Whenever the switch 174 is moved by its own bias and the de-energizing of the coil 170 into contact with the upper contact 178, the controller 110 disengages the clutch and applies a brake, or otherwise stops the operation of the movable parts of the machine which contact with the work.

Several circuits are connected with the terminal 164. There is a switch 192 operated by a cam 194 on a shaft 196 which rotates in timed relation with the operation of the machine. This shaft 196 makes one revolution for each cycle of operation of the machine and it closes the switch 192 to produce a control pulse which persists for a selected number of degrees of the cycle. For purposes of illustration, the switch 192 may be considered to be closed from 270° to 90° of the machine cycle. This switch 192 grounds the circuits which are connected with the terminal 164 when the switch 192 closes.

A terminal 200, having the —6 voltage, connects with the terminal 165 through a circuit having a signal lamp 202 and a conductor 204. The terminal 200 also connects with the terminal 164 through a parallel circuit containing a capacitor 206 and a diode 208.

A relay coil 210 (K1) has one side connected to the parallel circuit between the capacitor 206 and the diode 208. The other side of the coil 210 is connected with the terminal 200. A relay switch 212 has a bias toward open position but is closed when the coil 210 is energized. One side of the switch 212 is connected with the terminal 200. The other side of the switch 212 is connected through a resistor 214 and a diode 216 to the parallel circuit between the capacitor 206 and the diode 208. This other side of the switch 212 is also connected by a conductor 220 to the side of the coil 146 which is connected to the switch 144. There is a diode 222 in series with the conductor 220 to limit the flow of current to one direction.

In the operation of the apparatus the manual reset switch 186 is first operated to energize the coil 170 of the reset relay, and this energizing of the coil 170 closes the switches 172 and 174 against their lower contacts. This manual switch 186 must be held closed until all of the work stations of the machine contain a work piece and the machine reaches the 270° position of its cycle so that the switch 192 is closed.

With the switch 192 closed, there is a ground connection for the coil 170 through the switch 172, conductor 166, diode 162, terminal 164, and switch 192. This maintains the switches 172 and 174 closed against their lower contacts until the machine travels from its 270° position to its 90° position. Before reaching its 90° position, a ground connection for the coil 170 must be provided by the switch 152 if the machine is to continue operating.

The closing of the switch 192, by the cam 194, when the machine reaches its 270° position, causes the capacitor 206 to be charged and supplies an impulse of current to the coil 210 which closes the switch 212. This closing of the switch 212 establishes a circuit from the coil 146 through the conductor 220, diode 222 and switch 212 to the terminal 200. The energizing of the coil 146 closes the switch 144 to establish a holding circuit for the coil 146, and closes the switch 152 against its lower contact 156.

During the control pulse period, that is, from the 270° position to the 90° position of the machine, the work pieces should be transposed from one work station to the next. As each of the feelers 51, 81 and 131 touches a work piece or is operated by a work piece to ground the feeler, the circuit through the diode 140 for that feeler is no longer available for maintaining the excitation of the coil 146, the feeler, in effect, shorts out that circuit. When all of the feelers 51, 81 and 131 have been grounded, then the coil 146 will be no longer energized and this causes the switches 144 and 152 to open, the switch 152 moving into its biased position against the upper contact 164. This established a ground connection for the coil 170 of the reset relay 168 so that when the switch 192 opens at the end of the control pulse at the 90° position of the machine cycle, there will still be a ground circuit for the coil 170 and the switches 172 and 182 remain closed.

Since the switch 152 will remain in this position touching the top contact 154 until the switch 192 again closes, it is evident that the coil 170 of the reset relay 168 will remain energized continuously as long as all of the feelers 51, 81 and 131 short out their circuits during the control pulse period when work pieces should be delivered from one work station to the next along courses where the work pieces touch the feelers.

In the event that any one of the feelers 51, 81 and 131 is not touched by a work piece, then the coil 146 remains energized and the switch 152 is not in contact with the upper contact 154 when the switch 192 opens at the 90° position of the machine cycle. This breaks the circuit of the reset relay coil 170 and causes the switches 172 and 174 to move up against their top contacts with the result that the machine stops, as previously explained.

Although not an essential feature of the invention, the circuit shown in FIGURE 4 includes means for insuring that the operation of the control will not be affected by damage to a feeler or by shorting of a feeler circuit by lubricant or metal chips or in some other manner. It will be evident from the description thus far, that the feeler circuits should be open during the portion of the machine's cycle from 90° to 270°. If any feeler is grounded during this period it is the result of damage to the feeler or short circuiting of the feeler by lubricant or chips or some other manner.

There is a switch 230 connected on one side to a conductor 232 which is connected to diodes 234 with each of the feelers 51, 81 and 131. The other side of the switch 230 is connected with a relay coil 236 (K3) and this coil 236 operates a relay switch 238. The relay switch 238 has a bias toward open position and it closes when the coil 236 is energized. The side of the coil 236 opposite the switch 230 is connected with a terminal 240 having the −6 voltage of the other parts of the circuit.

The switch 230 is closed once during each cycle of the machine by a cam 242 on the shaft 196. This cam 242 is in such angular position on the shaft as to close the switch 230 sometime during the period from 90° to 270° in the machine cycle.

If the switch 230 closes and all of the feelers 51, 81 and 131 are in open circuit position, that is, are not grounded, then the closing of the switch 230 has no affect because it does not complete any circuit for the coil 236.

If any one of the feelers 51, 81 and 131 is grounded, however, when the switch 230 closes then the switch 236 will be energized and this will cause the switch 238 to close and energizes the coil 146 so that the switch 152 will be pulled away from the top cantact 154 which is a necessary part of the circuit of the coil 170 of the reset relay 168. Thus the circuit of the coil 170 is broken and the switches 172 and 174 move up against their upper contacts with the result that the machine is stopped.

Whenever the coil 170 is de-energized so as to cause the movable contacts of the switch 172 to move up into contact with the upper contact 176, the signal light 188 is lighted to indicate malfunctioning of the machine. The other signal light 202 operates once during each cycle to show that the switch 192 is operating satisfactorily and the lamps 133 between the different work stations operate each time that the feeler is operated by a work piece. If the lamps 133 remain lighted, it is an indication that the feeler for that particular lamp is short circuited.

From the wiring diagram it will be apparent that this invention requires only three relays, with a fourth one added if the machine is to have the refinement of automatic stopping in the event that a relay is short circuited outside of the control pulse. The diodes are small and inexpensive rectifiers which simplify the circuits.

It will be understood that in the broader aspects of the invention, the operation can be reversed by having the opening of circuits operate relays where the closing of circuits does so in the illustrated embodiment of the invention.

The preferred embodiment of the invention has been illustrated and described. It will be apparent that although the wiring diagram shows three feelers, the circuit can be made to operate with any number of feelers and stations or with only a single feeler. Various changes and modifications can be made and some features can be used in different combinations without departing from the invention as defined in the claims.

What is claimed is:
1. A control system for a cyclic operating machine including
    (a) a control relay operable to stop the machine,
    (b) a first and a second circuit for maintaining the control relay in operative position that causes continued operation of the machine,
    (c) each of said circuits including a switch movable into a control position that keeps the control relay in operative position,
    (d) actuating means that move the switch in the first circuit into its control position for a control pulse period constituting a given portion of each cycle, and that moves the switch in the second circuit out of its control position early in said control pulse period,
    (e) and means responsive to a normal movement of a work piece during the control pulse period for causing the switch in the second circuit to return to its control position before the end of the control period.
2. The control system described in claim 1 characterized by a plurality of successive work stations and transfer means for shifting successive work pieces from each work station, the means responsive to the normal movement of the work pieces including feelers in the path of movement of the work pieces from each work station, and parallel circuits for the different station feelers whereby simultaneous operation of all feelers is necessary to cause the switch in said second circuit to return to its control position.
3. Control apparatus for stopping operation of a cyclic machine in the event of malfunction, including
    (a) an electric control switch that controls the continued operation of the apparatus,
    (b) a first relay coil that operates the control switch in response to energizing of said coil,

(c) a control pulse circuit for energizing the first relay coil,
(d) a second switch in the control pulse circuit,
(e) an actuator that closes the second switch for a control pulse period constituting a given portion of each cycle of the machine,
(f) a third switch that closes to energize the first relay coil independently of said second swtch,
(g) a second relay coil that opens the third switch with each cycle of the machine and during the control pulse period,
(h) means for energizing the second relay coil upon closing of the second switch,
(i) and means responsive to a normal movement of a work piece during the control pulse period for de-energizing the second relay coil so that the third switch closes before the end of the control pulse period.

4. The control apparatus described in claim 3 characterized by the second relay coil being in the circuit with the second switch and acting upon closing of the second switch to open said third switch, means for limiting the second relay coil to a short pulse of current of substantially less duration than the control pulse period, a holding circuit for the second relay coil to maintain it energized beyond said short pulse, and the means responsive to a normal movement of a work piece including means for rendering the holding circuit ineffective.

5. The control apparatus described in claim 4 characterized by the means responsive to a normal movement of a work piece being a feeler in the path of movement of the work piece, a feeler circuit closed by contact of the feeler with a work piece, the feeler circuit being in position to short out the holding circuit for the second relay coil.

6. The control apparatus described in claim 5 characterized by the actuator being a cam and means moving the cam in timed relation with the operation of the machine to close the second switch and to hold it closed for a given portion of each cycle, the means limiting the second relay coil to a short pulse including a circuit having a capacitor with a time constant to produce the short pulse of current to the second relay coil, and the feeler including an element that touches the work piece and that forms with the work piece a grounding circuit that shorts out the second relay coil.

7. The control apparatus described in claim 6 characterized by the switches all having a bias in the direction away from the positions to which they are moved by energizing of their operating coils, and the holding circuit including another switch having a bias toward open position and that is moved into closed position by energizing of the second relay coil.

8. The control apparatus described in claim 5 characterized by the machine having a plurality of work stations, and there being separate feelers between the different work stations, and parallel circuit connections between said separate feelers and the second relay coil whereby simultaneous grounding of all of the feeler circuits is necessary to short out the second relay coil.

9. The control apparatus described in claim 8 characterized by auxiliary circuits in parallel with the feeler circuits from said feelers to the second relay coil, switch means in series with the parallel auxiliary circuits, an actuator that closes said switch means at a time in the cycle of the machine when there is no normal transfer of work pieces from the work stations and the feeler circuits should, therefore, all be open, an auxiliary relay coil in a circuit with said switch means and with the feelers and energized by closing of said switch means if any of the feeler circuits are closed.

10. The control apparatus described in claim 9 characterized by rectifiers in the parallel auxiliary circuits and other rectifiers in the parallel feeler circuits to the second relay coil, the rectifiers in the auxiliary circuit being oriented in opposite directions to the rectifiers in the parallel feeler circuits.

References Cited by the Examiner

UNITED STATES PATENTS

| | | | |
|---|---|---|---|
| 1,105,840 | 8/1914 | Richter | 72—4 |
| 1,480,741 | 1/1924 | Bourn | 72—4 |
| 2,513,349 | 7/1950 | Nase | 72—4 |
| 2,649,943 | 8/1953 | Meyers | 72—4 |

ORIS L. RADER, *Primary Examiner.*

T. B. JOIKE, *Assistant Examiner.*